(12) United States Patent
Anton et al.

(10) Patent No.: US 8,783,222 B2
(45) Date of Patent: Jul. 22, 2014

(54) APPARATUS AND METHOD OF CONTROL OF BALANCE SHAFTS IN AN ENGINE

(75) Inventors: Alexandre Anton, Paris (FR); Jean-Yves Der-Matheossian, Paris (FR)

(73) Assignee: Renault s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/981,496

(22) PCT Filed: Jan. 19, 2012

(86) PCT No.: PCT/FR2012/050111
§ 371 (c)(1),
(2), (4) Date: Jul. 24, 2013

(87) PCT Pub. No.: WO2012/110722
PCT Pub. Date: Aug. 23, 2012

(65) Prior Publication Data
US 2013/0312683 A1   Nov. 28, 2013

(30) Foreign Application Priority Data

Feb. 15, 2011   (FR) ...................... 11 00461

(51) Int. Cl.
*F02B 75/06*   (2006.01)
*F16F 15/26*   (2006.01)
*F16C 3/20*   (2006.01)

(52) U.S. Cl.
CPC ................. *F16F 15/264* (2013.01); *F16C 3/20* (2013.01)
USPC ................................ 123/192.2; 74/63; 464/1

(58) Field of Classification Search
USPC ............ 123/192.1, 192.2; 74/603, 604; 464/1
See application file for complete search history.

(56) References Cited

U.S. PATENT DOCUMENTS

| 4,556,026 A | 12/1985 | Masuda et al. |
| 2006/0067796 A1 | 3/2006 | Riedl |
| 2008/0276897 A1 | 11/2008 | Petridis et al. |

FOREIGN PATENT DOCUMENTS

| GB | 2 449 157 | 11/2008 |
| JP | 60 172748 | 9/1985 |
| JP | 62 106145 | 5/1987 |
| WO | 2004 022250 | 3/2004 |

OTHER PUBLICATIONS

International Search Report Isued Mar. 14, 2012 in PCT/FR12/050111 Filed Jan. 19, 2012.
French Search Report Issued Sep. 27, 2011 in Fr 1100461 Filed Feb. 15, 2011.

*Primary Examiner* — Noah Kamen
(74) *Attorney, Agent, or Firm* — Oblon, Spivak, McClelland, Maier & Neustadt, L.L.P.

(57) ABSTRACT

An internal combustion engine including: an even number of inline cylinders, each accommodating a piston; a crankshaft rotatably mounted about an axis; first and second balance shafts rotatably mounted about balancing axes parallel to and separate from the engine axis; and first and second mechanisms for rotating the first and second balance shafts at rotating speeds that are dependent on a rotating speed of the crankshaft. The balancing axes of the first and second balance shafts coincide, and the second rotating mechanism adjusts a phase difference between angular positions of the first and second balance shafts around the balancing axis.

17 Claims, 6 Drawing Sheets

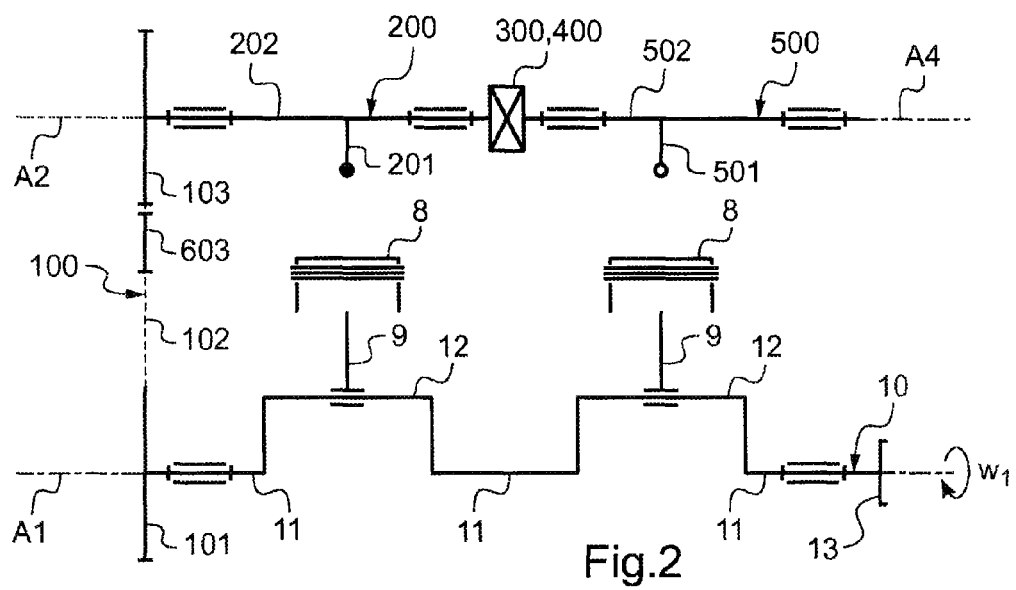
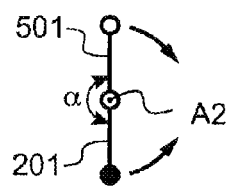
Fig.3A
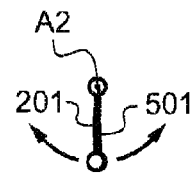
Fig.3B
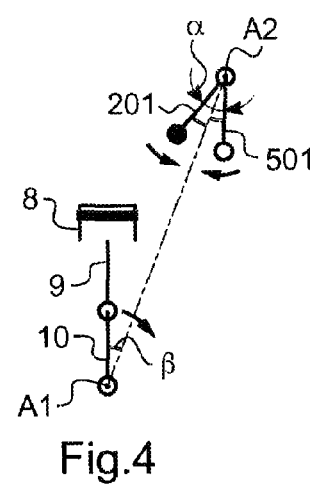
Fig.4

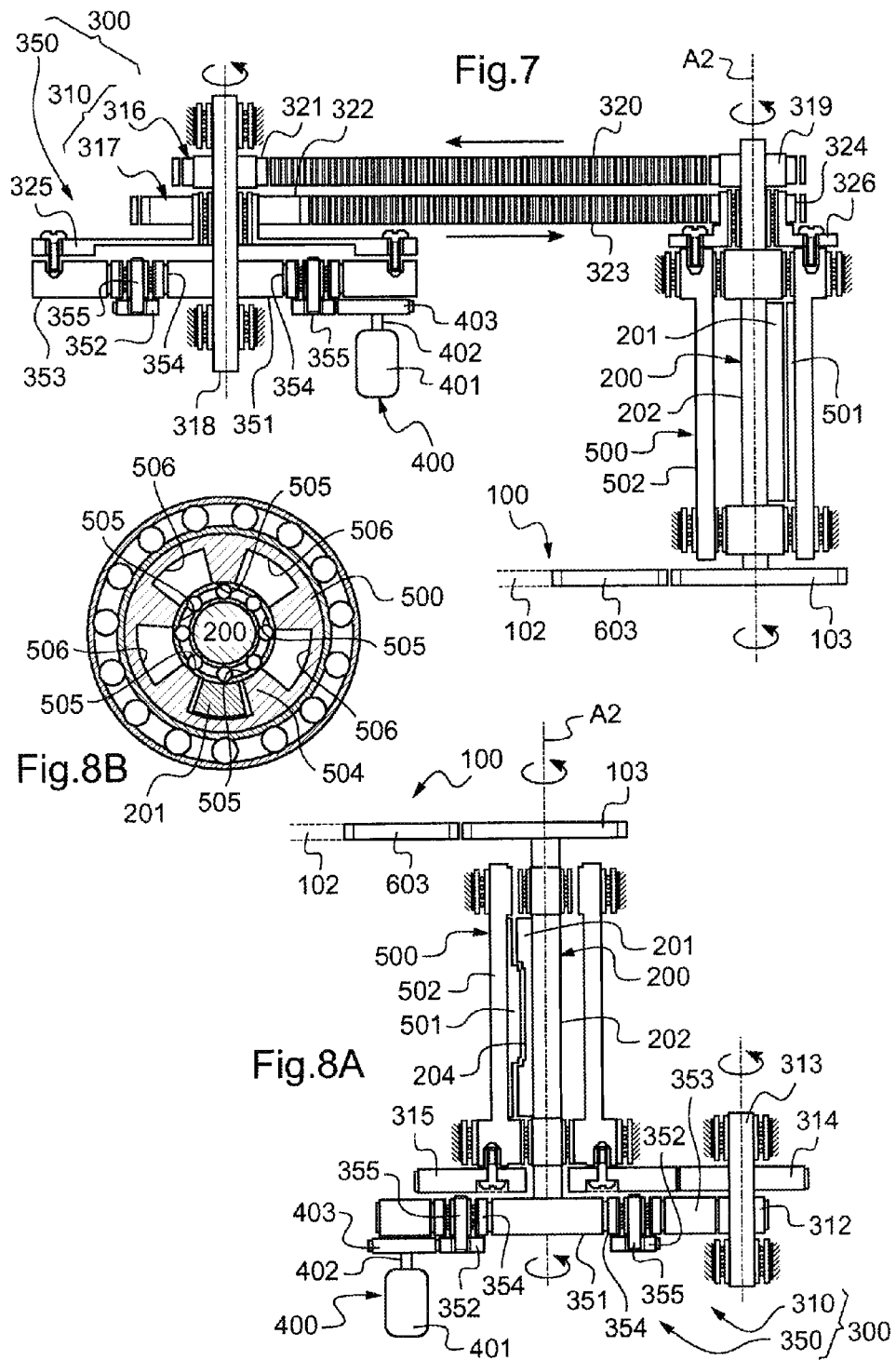

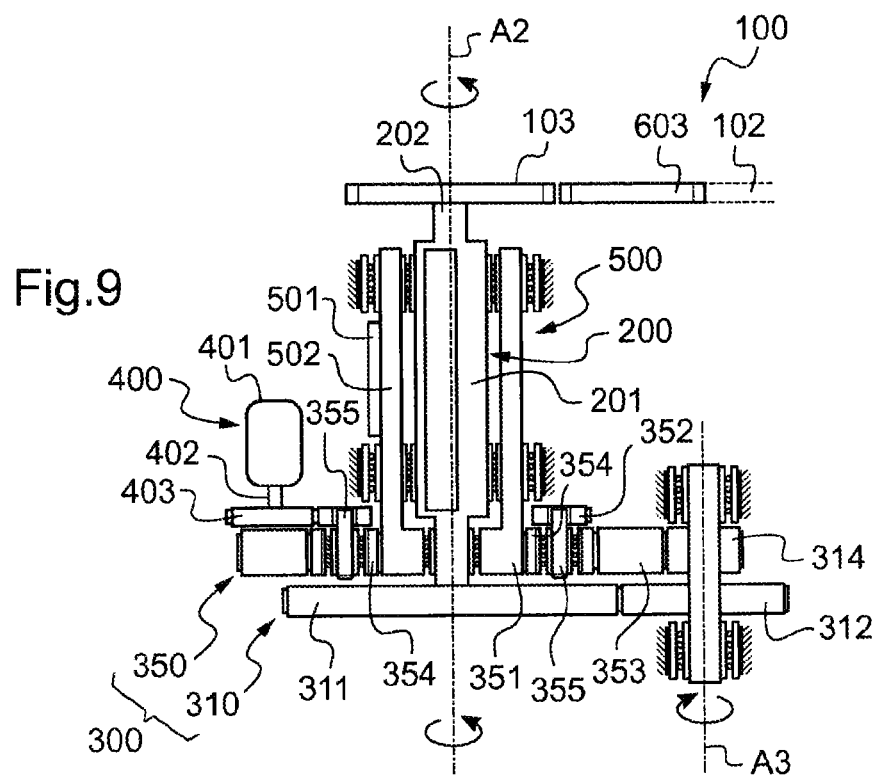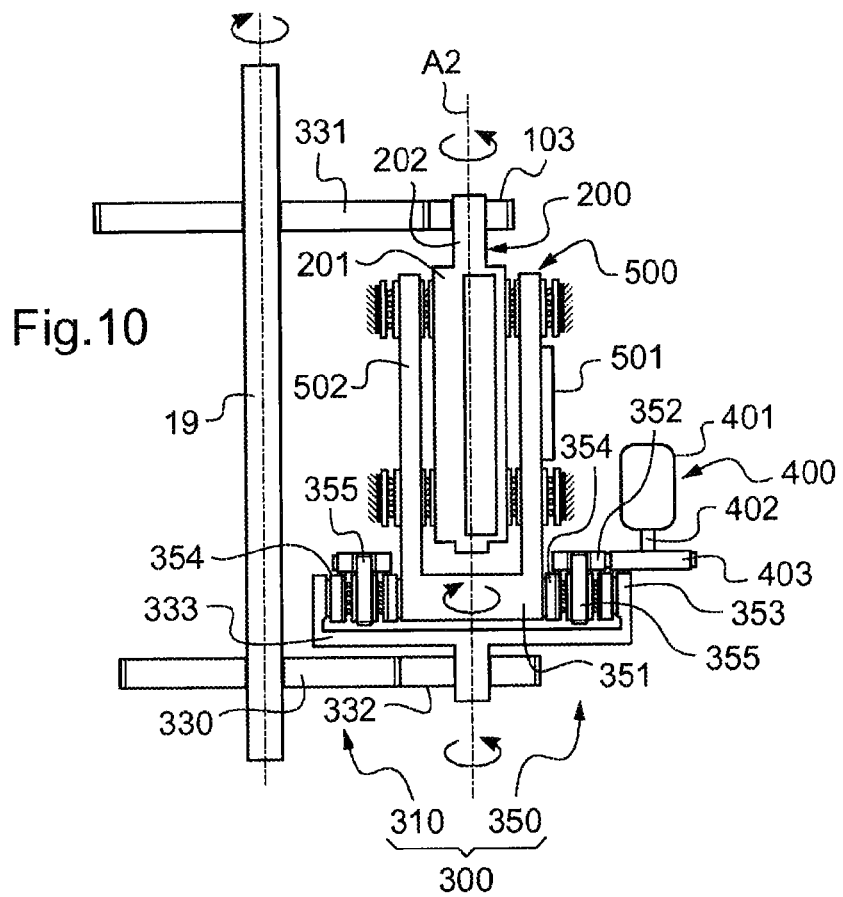

APPARATUS AND METHOD OF CONTROL OF BALANCE SHAFTS IN AN ENGINE

TECHNICAL FIELD OF THE INVENTION

The present invention relates in general to the balancing of internal combustion engines.

It relates more particularly to an internal combustion engine comprising:
- an even number of in-line cylinders,
- a crankshaft mounted to rotate about an engine axis,
- first and second balance shafts mounted to rotate about balance axes that are parallel and distinct from said engine axis,
- first rotational-drive means for turning said first balance shaft in a direction of rotation that is the opposite of the direction of rotation of said crankshaft and at a rotational speed that is a function of the rotational speed of said crankshaft,
- second rotational-drive means for turning said second balance shaft in a direction of rotation that is the opposite of the direction of rotation of said first balance shaft and at a rotational speed that is a function of the rotational speed of said crankshaft.

The invention finds a particularly advantageous application in the creation of internal combustion engines operating on a four-stroke combustion cycle with an identical number of combustion strokes on each revolution of the crankshaft.

The invention also relates to a method for controlling such an internal combustion engine.

TECHNOLOGICAL BACKGROUND

An internal combustion engine conventionally comprises a crankshaft rotating about a horizontal axis, pistons which slide in cylinders with reciprocating movements, and connecting rods the top ends of which are connected to the pistons and the bottom ends of which are connected to the crankshaft via eccentric connections. The reciprocating movement of the pistons, initiated by the combustion of a mixture of air and of fuel in the cylinders, thus provides the drive that turns the crankshaft.

Because of this device and because of the combustion of the mixture of air and fuel in the cylinders, such an engine is subject to vibrations which are troublesome not only to the occupants of the motor vehicle but also in terms of engine reliability.

At low speeds, when the driver of the motor vehicle demands high torque, the greatest vibrations are caused by the combustion of the fuel in the cylinders. The detonation of the air-fuel mixture in the cylinders in fact generates a "combustion vibration moment" that is very high.

At high speeds, the greatest vibrations are associated with the reciprocating movements of the piston, of the connecting rods and of the crankshaft. These movements in fact generate an "inertial vibration force" and an "internal vibration moment" which are very high.

To damp out some of these vibrations it is therefore known practice to equip the internal combustion engine with a system of balance shafts which, by rotating, generates inertial forces and inertial moments which oppose the aforementioned vibration moments and vibration forces.

An internal combustion engine comprising two identical balance shafts, arranged side by side, parallel to the crankshaft in a plane orthogonal to the axes of the cylinders is known, particularly from document FR 2 252 510 (or its US equivalent U.S. Pat. No. 3,995,610). By rotating at the same speed but in opposite directions, these balance shafts are able to counteract the inertial vibration moments and inertial vibration forces at high speeds, but are unable to counter the combustion vibration moment, which means that vibrations remain at low speeds.

Also known from that document FR 2 252 510 is an internal combustion engine comprising two identical balance shafts arranged side by side, parallel to the crank shaft, in a plane that is inclined with respect to the axis of the cylinders. Because they are arranged in the aforementioned inclined plane, these balance shafts are able to generate an additional moment which, when the inclination of the inclined plane is sufficient, counters the combustion vibration moment when the engine is operating at low speed and high load.

The disadvantage with such a system is that at high speed and/or at light load, the additional moment generated by these balance shafts is very much greater than the combustion vibration moment, which means that it generates new vibrations.

The aforementioned two balance shaft systems are therefore unable to effectively damp the vibrations for all engine operation configurations.

These balance shafts, which are situated in a plane that is orthogonal to or inclined with respect to the axes of the cylinders also require a large amount of clearance volume in which to turn, and this is incompatible with the objectives of increasing the engine compactness.

OBJECT OF THE INVENTION

In order to address the abovementioned disadvantages of the state of the art, the present invention proposes an internal combustion engine that is more compact, in which the balance shaft system is controlled in such a way that it evolves dynamically according at least to engine speed, in order as best and continuously to damp engine vibrations.

More specifically, the invention proposes an internal combustion engine as defined in the introduction, in which the balancing axes of the first and second balance shafts coincide, and in which the second rotational—drive means for driving the second balance shaft comprise means of adjusting the phase angle between the first and second balance shafts.

Thus, by virtue of the invention, it is possible to phase-shift the two balance shafts, for example by plus or minus 180 degrees.

It is thus possible, when the engine is operating at low speed and/or at high load, to counter the combustion vibration moment by positioning the two balance shafts in phase opposition.

It is also possible, when the engine is operating at high speed and/or at low load, to counter the inertia vibration moment and inertia vibration force by positioning the two balance shafts in phase.

Other advantageous and nonlimiting features of the engine according to the invention are as follows:
- the first and second rotational-drive means are designed to drive said first and second balance shafts at equal rotational speeds when said phase adjusting means are inactive;
- said second rotational-drive means comprise a reducer and an epicyclic gear train, and the phase adjusting means are designed to control the reduction ratio of said epicyclic gear train;
- said epicyclic gear train comprises an outer annulus, a sun gear and a planet carrier carrying at least one planet pinion interposed between said outer annulus and said sun gear, and the phase adjusting means comprise an electric motor the output shaft of which is connected to the planet carrier to adjust the angular position of each planet pinion about the axis of the outer annulus;

one of said first and second balance shafts is fixed or directly connected to said outer annulus or to said sun gear, and the other of said first and second balance shafts is indirectly connected to said outer annulus or to said sun gear, via said reducer;

one of said first and second balance shafts is formed as one with said outer annulus or said sun gear, and the other of said first and second balance shafts is indirectly connected to said outer annulus or to said sun gear via said reducer;

the first and second balance shafts each comprise a balance weight designed to generate a centrifugal force of an intensity equal to that generated by the other balance weight when the first and second balance shafts are rotating at the same angular velocity;

with each cylinder housing a piston, the balance weight of one of said balance shafts is at bottom dead center when the pistons of the two central cylinders are at top dead center;

the median plane between the planes of rotation of the centers of gravity of said balance weights coincides with the plane of symmetry of the two central cylinders;

the balancing axes of the first and second balance shafts are separate;

the balancing axes of the first and second balance shafts coincide;

one of said first and second balance shafts is hollow and has the other of said first and second balance shafts passing through it;

the first and second balance shafts are at least partially housed inside the cylinder head;

said phase adjusting means comprise acquisition means for acquiring the rotational speed of the crankshaft and for acquiring a phase angle that is the difference in phase between the angular positions of the first and second balance shafts when the pistons housed in the two cylinders are at top dead center, and control means for controlling the phase adjusting means as a function of the acquired rotational speed and of the acquired phase angle, and when said phase adjusting means are inactive, the first and second rotational-drive means are designed to drive said first and second balance shafts at rotational speeds which are equal to that of the crankshaft if the engine has two cylinders and which are equal to twice that of the crankshaft if the engine has four cylinders.

The invention also relates to a method for controlling such an internal combustion engine, involving steps consisting in:

acquiring the rotational speed of the crankshaft, acquiring a phase angle that is the difference in phase between the angular positions of the first and second balance shafts when the pistons housed in the two central cylinders are at top dead center, and when the acquired rotational speed exceeds a first determined threshold, controlling the phase adjusting means so as to set the phase angle to a predetermined angle less than 90°, and when the acquired rotational speed drops below a second determined threshold, controlling the phase adjusting means so as to set the phase angle to 180°.

Advantageously, in instances in which the axes of the two balance shafts coincide, this predetermined angle is equal to twice the angle of inclination between the plane passing through the axes of the two cylinders and the plane passing through the engine axis and through the median axis between the two balancing axes.

DETAILED DESCRIPTION OF ONE EMBODIMENT

The description which follows, with reference to the attached drawings, and given by way of nonlimiting example, will make it easy to understand what the invention consists in and how it may be embodied.

In the attached drawings:

FIG. 2 is a schematic view of the moving parts of the internal combustion engine in FIG. 1, showing in particular the crankshaft, the balance shafts, and the means for driving the rotation of the balance shafts;

FIGS. 3A, 3B and 4 are diagrams illustrating various adjustments of the phase angle between the two balance shafts of FIG. 2; and FIGS. 5 to 11 are schematic views of various embodiments of the drive means that drive the two balance shafts and of the adjusting means that adjust the phase angle between these two shafts.

As a preliminary it will be noted that elements that are identical or similar in the various alternative forms and the various embodiments of the invention and depicted in the various figures will, as far as possible, be referenced using the same reference signs and will not be described in each instance.

Figure 1:
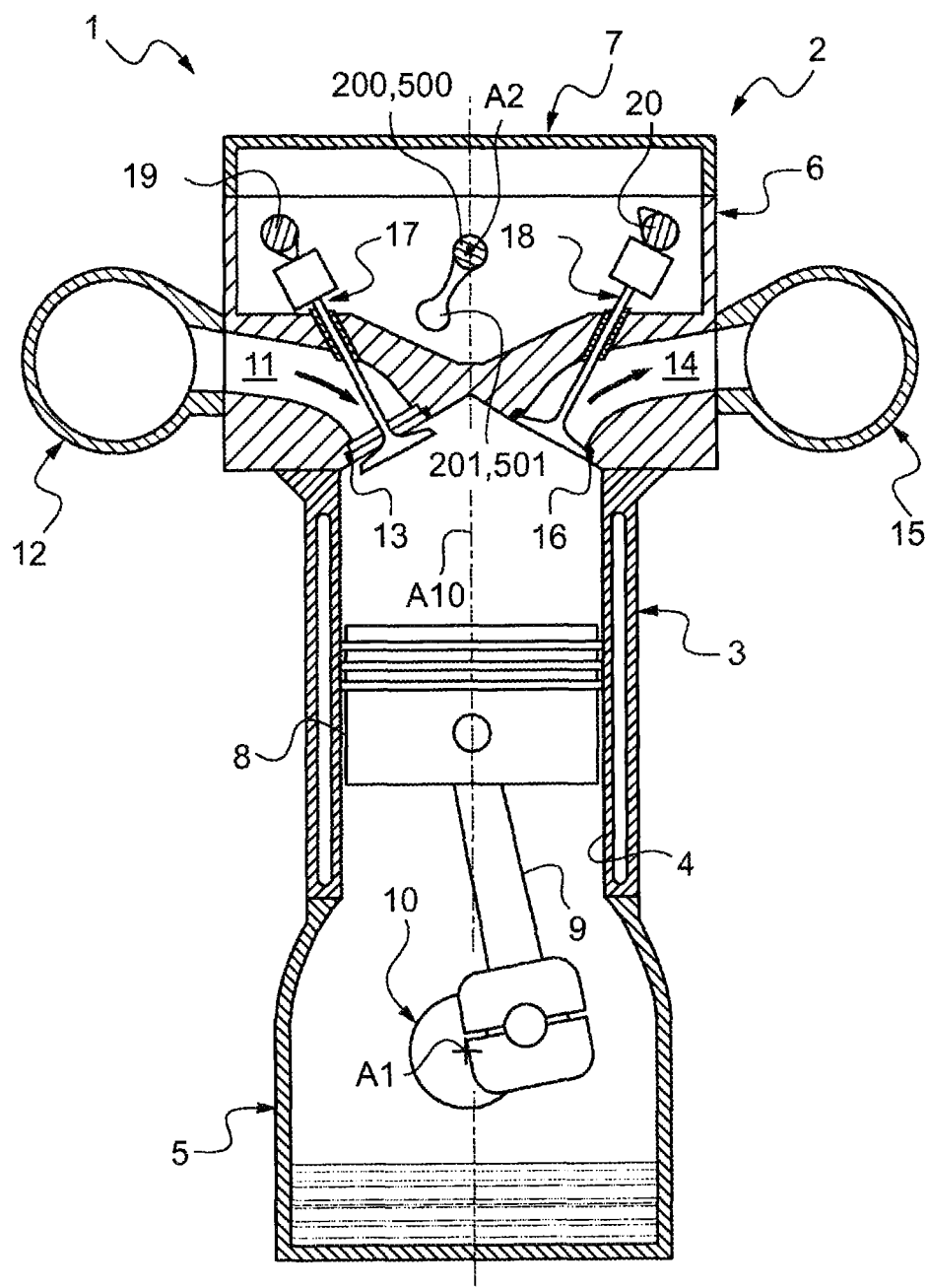
FIG. 1 is a view in cross section of an engine block of an internal combustion engine according to the invention.

FIG. 1 schematically depicts an engine block 2 of an internal combustion engine 1.

This engine block 2 comprises a cylinder block 3 which in this instance is provided with two in-line cylinders 4 with vertical axes A10.

This cylinder block 3 is connected, at its lower edge, to a sump 5 containing oil intended to lubricate the various parts of the engine and, at its upper edge, to a cylinder head 6 which is itself covered with a cylinder head cover 7.

In the conventional way, each cylinder 4 houses a piston 8 which is designed to slide along its internal wall in a reciprocating (or back and forth) rectilinear movement the axis of which coincides with the axis A10 of the cylinder 4.

The piston 8 has a peripheral skirt which is transversely pierced with two openings to accommodate a pin on which a top end of a connecting rod 9 is engaged. The bottom end of this connecting rod 9 is connected, via an eccentric connection, to a crankshaft 10. Thus, the reciprocating rectilinear movement of the piston 8 turns the crankshaft 10 of the internal combustion engine 1 about its longitudinal axis known as the engine axis A1.

To damp the vibrations caused by the combustion of the mixture of fresh air and fuel in the cylinders 4 and by the movements of the moving couplings 8, 9, 10 of the engine, the cylinder head 6 houses a balancing device 200, 500. This balancing device 200, 500 is housed in the cylinder head 6 so that it can enjoy the maximum length of lever arm to generate an inertial moment which opposes the combustion vibration moment generated by the combustion of the fuel in the cylinders at low speed and/or high load.

To admit fresh air to each cylinder 4, the cylinder head 6 is pierced with an intake duct 11 which extends from an air manifold 12 fixed to the cylinder head 6 as far as an intake opening 13 provided in a lower face of the cylinder head 6. To exhaust burnt gases from each cylinder 4, the cylinder head 6 is pierced with an exhaust duct 14 which begins in an exhaust opening 16 adjacent to the intake opening 13 and which opens into an exhaust manifold 15 fixed to the cylinder head 6.

To regulate the flow rates of incoming fresh air and outgoing burnt gases for each cylinder 4, the cylinder head 6 comprises inlet valves 17 and exhaust valves 18 the flared ends of which block the intake openings 13 and exhaust openings 14 of the fresh air intake ducts 11 and of the burnt gas exhaust ducts 14. These intake 17 and exhaust 18 valves are conventionally controlled in terms of their position by camshafts 19, 20 mounted to rotate in the cylinder head 6 and which are connected in rotation to the crankshaft 10 via a drive means that has not been depicted, in this instance a timing belt. This drive means could of course be embodied in a different way (timing chain, train of timing pinions, etc.). The cams of these camshafts 19, are arranged in such a way that they press periodically against the valves 17, 18 so that each valve "lifts" regularly in order to open up a passageway for the fresh air or the burnt gases.

As shown more specifically in FIG. 2, the crankshaft 10 is in the overall form of a shaft having two cranks spaced apart, on which cranks the bottom ends of the connecting rods 9 are mounted such that they can rotate so as to form the above-mentioned eccentric connections. The crankshaft 10 is then said to be a two-throw crank with two crank pins 12 interposed between three journals 11. Whereas the journals 11 run in the direction of the engine axis A1, the crank pins 12 extend along an axis parallel to and distinct from the engine axis A1.

One of the end journals 11 bears a flywheel 13 designed to collaborate with a clutch so that the torque from the crankshaft 10 can be transmitted to the wheels of the motor vehicle.

The other of the end journals 11 bears a timing pinion 101 which, via a timing belt 102, drives engine auxiliaries, such as the camshafts 19, 20, the water pump, the alternator and the fan.

The balancing device, which is partially housed in the cylinder head 6, for its part comprises:
- a first balance shaft 200,
- a second balance shaft 500,
- first rotational-drive means 100 for turning the first balance shaft 200 about a first balance axis A2, and
- second rotational-drive means 300 for turning the second balance shaft 500 about a second balance axis A4, in a direction of rotation that is the opposite of that of the first balance shaft 200.

According to one particularly advantageous feature of the invention, this balancing device also comprises means 400 for adjusting the phase angle between the first and second balance shafts 200, 500.

FIGS. 5 to 11 depict various embodiments of this balancing device.

In these various embodiments, as FIG. 2 schematically shows, the first and second balance shafts 200, 500 each comprise a shaft body 202, 502 equipped with a balance weight 201, 501, which means a weight of which the shape, mass and radial position with respect to the balance axis A2, A4 are suited to developing a centrifugal force when the shaft body 202, 502 rotates about this balance axis A2, A4.

Because the two balance shafts 200, 500 rotate in opposite directions, the phase angle will be defined here by convention as a phase angle a (FIG. 3A) that corresponds to the angle that the axes of the two balance weights 201, 501 make when the pistons 8 are at top dead center. Quite obviously, this phase angle could be defined differently.

In FIG. 2, the balance weights 201, 501 are depicted as being identical, inasmuch as they have identical shapes, masses and radial positions.

As an alternative, these balance weights 201, 501 could be equivalent inasmuch as despite having a different shape and/or mass and/or radial position, they generate centrifugal forces of equal intensities when the two balance shafts 200, 500 are rotating at equal rotational speeds.

The two balance shafts 200, 500 are positioned in the cylinder head 6 in such a way that the median plane of the balance weights 201, 501 (defined as being the median plane between the planes of rotation of the centers of gravity of the balance weights) coincides with the plane of symmetry of the two cylinders 4. Thus, the two balance shafts 200, 500 create no inertial moment about an axis perpendicular to the axes A10 of the cylinders 4.

As depicted in FIG. 2, the balance axes A2, A4 of the first and second balance shafts 200, 500 coincide and therefore form one and the same single balance axis A2.

As FIGS. 3A and 3B show, this balance axis A2 then preferably lies in the plane passing through the axes A10 of the cylinders 4.

As FIG. 4 shows, in order to comply with certain constraints regarding the installation of the balance shafts 200, 500 in the engine block 2, provision may be made for the balance shafts 200, 500 to be positioned differently, such that the plane passing through the balance axis A2 and through the engine axis A1 is inclined by a non-zero angle β with respect to the plane passing through the axes A10 of the cylinders.

The disadvantage with that arrangement is that when the balance shafts 200, 500 are rotating, they generate an inertial force which is no longer correctly referenced with respect to the inertial force generated by the reciprocating movements of the pistons 8 and of the connecting rods 9. To rectify this phenomenon, at high speeds, the phase angle a applied is not zero degrees but twice the angle of inclination β.

Again as an alternative, and as will be described in greater detail later on in this description with reference to FIG. 11, provision may be made for the balance axes A2, A4 to be parallel and distinct.

As FIG. 2 shows, the first rotational-drive means 100 are designed to turn the first balance shaft 200 in a direction of rotation that is the opposite of the direction of rotation of the crankshaft 10 and at a rotational speed which is always equal to the rotational speed of the crankshaft 10.

For preference, these first rotational-drive means 100 are exclusively mechanical.

As depicted in FIG. 2, these first rotational-drive means 100 make use of the fact that the timing belt 102 runs through the cylinder head 6. For that reason they comprise an input pinion 103 which is fixed to a first end of the first balance shaft 200 and which meshes with a pinion 603 fixed to a rotary shaft driven by the timing belt 102. The input pinion 103 and the pinion 603 each have a diameter and a number of teeth which are such that the first balance shaft 200 rotates at the same angular velocity as the crankshaft 10.

As an alternative, these first rotational-drive means could be formed differently, for example by a chain or a train of pinions connecting the first balance shaft 200 to one of the two camshafts 19, 20 (as will be described for example in greater detail later on in this description, with reference to FIG. 10).

Again as an alternative, provision could be made for these first rotational-drive means to be electro-mechanical. They could then comprise an electric motor controlled in such a way as to cause the first balance shaft 200 to turn at the speed of the crankshaft 10.

The first rotational-drive means 100 are, in whatever form they might take, arranged here in such a way that when the pistons 8 are at top dead center, which means to say at the topmost point of their stroke in the cylinders 4, the balance weight 201 with which the first balance shaft 200 is equipped is positioned at bottom dead center, i.e. at the bottommost point of its stroke in the cylinder head 6.

The second rotational-drive means 300 are, for their part, arranged in such a way as to turn the second balance shaft 500 in a direction of rotation that is the opposite of the direction of rotation of the first balance shaft 200 and at a rotational speed that is equal to the rotational speed of the first balance shaft 200 when the phase angle adjusting means 400 are inactive.

Indeed it will be noted that when the phase angle adjusting means 400 are activated to correct the phase angle between the two balance shafts 200, 500, they alter the rotational speed of the second balance shaft 500 with respect to that of the first balance shaft 200.

In the various embodiments of the invention which have been depicted in FIGS. 5 to 11, these second rotational-drive means 300 comprise a reducer 310 and an epicyclic gear train 350.

The reducer 310, formed of gears, has a reduction ratio r1 (strictly less than or strictly greater than 1) which is constant. This epicyclic gear train 350 for its part has a reduction ratio r2 that is variable.

The reduction ratios r1, r2 are chosen in such a way that when the phase angle adjusting means 400 are inactive, $|r1 \times r2|=1$. In this way, the two balance shafts 200, 500 turn at the same speed.

In the various embodiments depicted, the phase angle adjusting means 400 comprise an electric motor 401 designed to control the reduction ratio r2 of this epicyclic gear train 350.

In order to control the various parts of the internal combustion engine 1 and notably this electric motor 401, there is provided a computer that comprises a processor (CPU), a random access memory (RAM), a read only memory (ROM), analogue-digital converters (A/D) and various input and output interfaces.

Via its input interfaces the computer is designed to receive input signals originating from various sensors. These input signals relate to the operation of the engine (load, rotational speed w1 of the crankshaft 10, phase angle a, water temperature, air pressure, etc.).

Using a map that is predetermined on test beds and installed in its read only memory, the computer is able, for each engine operating condition, to generate output signals.

Finally, via its output interfaces, the controller is designed to transmit these output signals to the various parts of the engine, notably to the fuel injectors, to a valve that regulates the intake air flow rate, and to the electric motor 401.

Figure 5:
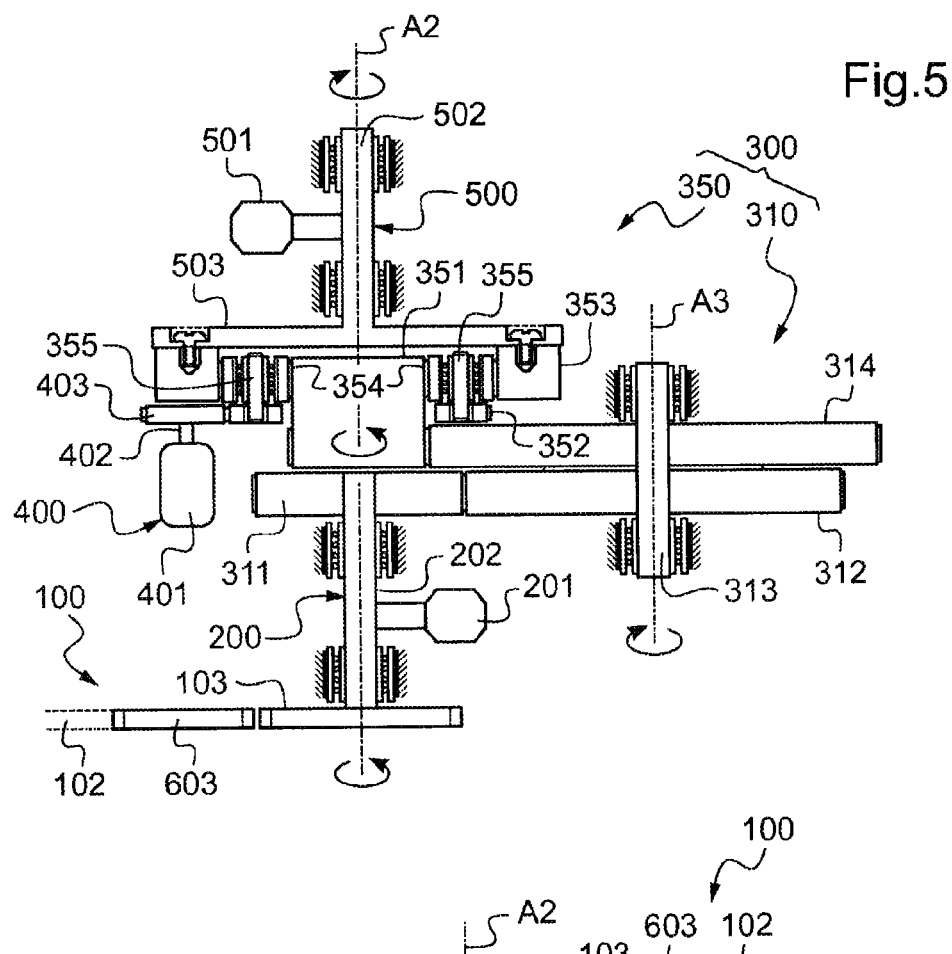

FIG. 5 depicts in detail a first embodiment of the balancing device.

In this embodiment, the balance weights 201, 501 of the two balance shafts 200, 500 are identical.

The shaft bodies 202, 502 of these two balance shafts 200, 500 are positioned in the continuation of one another and are designed to rotate about the same balance axis A2.

The reducer 310 and the epicyclic gear train 350 are interposed between these two balance shafts 200, 500.

The reducer 310 for this purpose comprises an intermediate shaft 313 which is mounted to rotate about an axis A3 parallel to and distinct from the balance axis A2. This intermediate shaft 313 bears two pinions 312, 314 of different diameters, which are fixedly mounted thereon.

The reducer 310 also comprises a first pinion 311 which is fixedly mounted on one end of the first balance shaft 200, the opposite end from the input pinion 103, and which meshes with one of the pinions 312 of the intermediate shaft 313.

The epicyclic gear train 350 for its part comprises a sun gear 351, an outer annulus 353 and a planet carrier 352 equipped with at least one planet pinion 354 interposed between the outer annulus 353 and the sun gear 351.

The input to this epicyclic gear train 350 is formed here by the sun gear 351 which meshes with the other of the pinions 314 of the reducer 310. The output of this epicyclic gear train 350 is then formed of the outer annulus 353. The latter for that purpose is fixed by bolts to a flange 503 which is situated at one end of the second balance shaft 500 and is as one therewith.

To make the epicyclic gear train 350 easier to depict, the planet carrier 352 is depicted here as being equipped with four planet pinions 354, such that two planet pinions 354 are visible in the plane of section of FIG. 5. For preference, this epicyclic gear train 350 will have just three planet pinions evenly distributed about the axis of rotation A2 of the sun gear 351.

The planet carrier 352 here takes the form of an annulus situated around the sun gear 351, facing the planet pinions 354. This planet carrier 352 is equipped with three spindles 355 parallel to the balance axis A2 and equipped with rolling bearings on which the three planet pinions 354 are mounted.

The diameters and numbers of teeth of the outer annulus 353, of the sun gear 351 and of the planet pinions 354 are designed so that when the planet carrier 352 is stationary, the second balance shaft 500 turns at a rotational speed equal to that of the first balance shaft 200, in a direction of rotation that is the opposite of that of the first balance shaft 200.

The means 400 for adjusting the phase angle between the two balance shafts 200, 500 then comprise, aside from the electric stepping motor 401, a pinion 403 which is fixedly mounted on the output shaft 402 of this electric motor 401 and which meshes with teeth provided on the exterior peripheral edge of the planet carrier 352.

This electric motor 401 is controlled by pulses of electric current so as to cause the planet carrier 352 to rotate about the balance axis A2, thereby allowing precise adjustment of the angular position of the planet pinions 354 about the balance axis A2 so as to alter the phase angle a.

The electric motor 401 is then controlled more particularly as follows.

The computer continuously acquires the angular velocity w1 of the crankshaft 10 and the phase angle a.

When the internal combustion engine is started up, the computer emits a control command signal to the electric motor 401 to introduce a phase angle between the two balance shafts 200, 500 of a magnitude a equal to 180 degrees (FIG. 3A). This is because at low speed, the vibrations generated by the combustion of the mixture of fuel and fresh air in the cylinders 4 are troublesome to the occupants of the motor vehicle which means that the moment generated by this combustion needs to be balanced by introducing a phase angle between the balance shafts 200, 500.

Then, when the angular velocity w1 of the crankshaft 10 exceeds a first predetermined threshold (in this instance equal to 2000 revolutions per minute) the computer emits a control command signal to the electric motor 401 to bring the two balance shafts 200, 500 into phase with one another, with a phase angle a of 0 degrees (FIG. 3B). This is because beyond this threshold, the vibrations generated by the moving couplings 8, 9, 10 of the engine block 2 are the most troublesome for the occupants of the motor vehicle which means that the inertia forces and moments generated by these moving parts need to be countered by positioning the two balance weights 201, 501 of the balance shafts 200, 500 in phase opposition with respect to the crank pins 12 of the crankshaft 10.

Then, when the angular velocity w1 of the crankshaft 10 drops back below a second predetermined threshold, lower than or equal to the first threshold (in this instance equal to 2000 revolutions per minute), the computer once again emits a control command to the electric motor 401 to introduce a phase angle a equal to 180 degrees between the two balance shafts 200, 500.

The first and second thresholds, stored in the read only memory of the computer, are predetermined either empirically or by calculation as a function of the mass of the engine, the magnitude of the pressures in the cylinders, and the geometric layout of the balance weights 201, 501 on the balance shafts 200, 500.

As an alternative, provision could be made for the electric motor 401 to be controlled not only as a function of the angular velocity w1 of the crankshaft 10 but also as a function of the engine load. For that purpose, provision could be made for the first and second abovementioned thresholds not to be fixed but to vary according to engine load.

Whatever approach is adopted, during transitional phases in which the electric motor 401 is controlled to alter the phase angle a, the computer may either temporarily increase the rotational speed of the second balance shaft 500 (so that the second balance shaft leads the first balance shaft, having a phase angle of +180 degrees), or may temporarily reduce the rotational speed of the second balance shaft 500 (so that the second balance shaft lags behind the first balance shaft, having a phase angle of −180 degrees).

In this instance, the electric motor 401 is controlled in such a way as to increase the rotational speed of the second balance shaft 500 when the angular velocity w1 of the crankshaft 10 exceeds the first threshold and to reduce the rotational speed of the second balance shaft 500 when the angular velocity w1 of the crankshaft 10 drops below the second threshold, so as to minimize vibrations caused by these transition phases.

Figure 6:
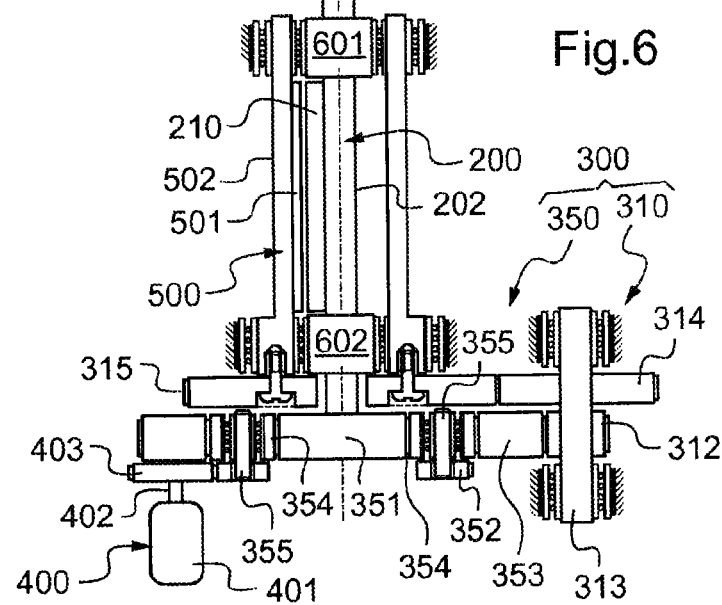

FIG. 6 depicts a second embodiment of the balancing device.

In this second embodiment, the two balance shafts 200, 500 are not positioned in the continuation of one another but are rather positioned one inside the other, making it possible to increase the compactness of the balancing device.

The shaft body 202 of the first balance shaft 200 therefore takes the form of a cylindrical stem exhibiting symmetry of revolution about the balance axis A2.

The balance weight 201 of this first balance shaft 200 has the form of a rectangular plate extending lengthwise along the balance axis A2 and widthwise radially with respect to this axis, making it possible to reduce its radial dimension.

The shaft body 502 of the second balance shaft 500 for its part takes the form of a tube, so that it can house the first balance shaft 200. It is therefore fitted over the first balance shaft 200 and mounted with the freedom to rotate on the latter by means of a set of rolling bearings 601, 602.

The balance weight 501 of this second balance shaft 500 consists of an interior bulge which is elongate along the balance axis A2 and has a low radial dimension so that it does not conflict with the balance weight 201 of the first balance shaft 200 when the two balance shafts 200, 500 are rotating in opposite directions.

In this embodiment, the input to the epicyclic gear train 350 is formed by the sun gear 351. The latter for this purpose has a central opening forcibly fitted onto one end of the shaft body 202 of the first balance shaft 200, at the opposite end from the input pinion 103.

The output of this epicyclic gear train 350 is then formed by the outer annulus 353 which for this purpose has an external set of teeth meshing with one of the pinions 312 of the reducer 310.

The other of the pinions 314 of this reducer 310 for its part meshes with a pinion 315 fixed by screws to one end of the second balance shaft 500.

In this embodiment, the means 400 for adjusting the phase angle between the two balance shafts 200, 500 likewise comprise an electric stepping motor 401 and a pinion 403 which is fixedly mounted on the output shaft 402 of this electric motor 401 and which meshes with a set of teeth provided on the outer peripheral edge of the planet carrier 352.

FIG. 7 depicts a third embodiment of the balancing device.

In this third embodiment, the first and second balance shafts 200, 500 have forms that are identical to those of the balance shafts depicted in FIG. 6. By contrast, they are situated some distance from the epicyclic gear train 350 so as to comply with certain constraints on how the balancing device can be fitted into the engine block 2.

Neither of these two balance shafts 200, 500 is therefore directly connected to the outer annulus 353 or to the sun gear 351 of the epicyclic gear train 350.

On the contrary, between the two balance shafts 200, 500 on the one hand, and the input and output of the epicyclic gear train 350 on the other, there are two torque-transmission mechanisms 316, 317 installed.

As depicted in FIG. 7, these torque transmission mechanisms 316, 317 comprise two drive belts 320, 323 which could of course be replaced by chains or trains of pinions.

A first of these drive belts 320 connects for the purposes of rotation a first pinion 319 forcibly mounted on the first balance shaft 200 and a second pinion 321 forcibly mounted on a shaft 318 on which the sun gear 351 of the epicyclic gear train 350 is fitted. This first drive belt 320 thus allows the first balance shaft 200 to drive the rotation of the sun gear 351, which therefore forms the input to the epicyclic gear train 350.

A second of these drive belts 323 secures together for the purposes of rotation a third pinion 322 forcibly mounted on a flange 325 fixed to the outer annulus 353 of the epicyclic gear train 350 and a fourth pinion 324 forcibly mounted on a flange 326 fixed by screws to the second balance shaft 500. This second drive belt 323 thus allows the outer annulus 353 of the epicyclic gear train 350 to drive the rotation of the second balance shaft 500.

In this embodiment, the two torque transmission mechanisms 316, 317 together form the reducer 310, inasmuch as the diameter and number of teeth of the pinions 319, 321, 322, 324 are chosen according to the desired reduction ratio k1.

The means 400 for adjusting the phase angle between the two balance shafts 200, 500 here also comprise an electric stepping motor 401 and a pinion 403 which is mounted fixedly on the output shaft 402 of this electric motor 401 and which meshes with a set of teeth provided on the outer peripheral edge of the planet carrier 352.

FIG. 8A depicts a fourth embodiment of the balancing device.

In this embodiment, the various components of the balancing device are identical to those of the balancing device depicted in FIG. 6 except for the first and second balance shafts 200, 500 the shapes of which differ from those of the balance shafts depicted in FIG. 6.

The balance weights 201, 501 of these two balance shafts 200, 500 in fact here have profiles the shapes of which complement one another so that these balance weights 201, 501 are capable of imbricating with one another.

The balance weight 201 of this first balance shaft 200 more specifically here has the form of a rectangular plate extending lengthwise along the balance axis A2 and widthwise radially with respect to this axis and of which the free edge (parallel to the balance axis A2) has a central cutout 204.

The balance weight 501 of the second balance shaft 500 for its part consists of an interior bulge elongate along the balance axis A2 and which, disregarding clearances, has a length equal to that of the cutout 204 and a height equal to the depth of this cutout 204.

Thus, the two balance weights 201, 501 will not conflict with one another when the two balance shafts 200, 500 are turning in opposite directions. They also have centers of gravity the circular paths of which coincide.

As depicted more specifically in FIG. 8B, in order to allow the first balance shaft 200 to be mounted inside the second balance shaft 500, one of the ends of this second balance shaft 500 is closed by a crenellated wall 504. The top edges 505 of the crenels thus allow a rolling bearing to be held between the two balance shafts 200, 500, while the spaces 506 (or "merlons") situated between the crenels allow the balance weight 201 of the first balance shaft 200 to pass inside the second balance shaft 500 when the two shafts are being put together.

FIG. 9 depicts a fourth embodiment of the balancing device.

In this embodiment, the balancing device has a shape similar to that of the balancing device depicted in FIG. 6. However, it differs from the latter through the form of its epicyclic gear train 350 and by the form of its balance shafts 200, 500.

Here, at least one of the two balance shafts 200, 500 is in fact as one with the sun gear 351 or with the outer annulus 353 of the epicyclic gear train 350.

In this particular instance, the second balance shaft 500 is formed as one with the sun gear 351. For that purpose at one of its ends it has a peripheral set of teeth which performs the function of a sun gear.

In this embodiment, the balance weight 501 of this second balance shaft 500 is here situated on the external face of the shaft body 502, allowing it to generate a higher centrifugal force than it could if it were situated inside the shaft body 502.

The first balance shaft 200 for its part has a central part of greater diameter than its two ends. Its central part also has an internal hollowing which does not exhibit symmetry of revolution about the balance axis A2, such that the non-hollowed part forms the balance weight 201 of this shaft.

FIG. 10 depicts a fifth embodiment of the balancing device.

In this embodiment, the first balance shaft 200 is not directly rotationally driven by the timing belt 102. Rather, the two balance shafts 200, 500 are directly driven in rotation by one of the two camshafts 19.

This camshaft 19 for this purpose bears two pinions 330, 331 each of which is designed, independently of one another, to drive the first and second balance shafts 200, 500.

For that purpose, one of these pinions 331 meshes with the input pinion 103 mounted fixedly at one of the ends of the first balance shaft 200, while the other of these pinions 330 meshes with a pinion 332 which is fixed, via a flange 333, to the outer annulus 353 of the epicyclic gear train 350.

In this embodiment, the reducer 310 is formed by these pinions 103, 330, 331, 332, the diameters and numbers of teeth of which are chosen according to the desired reduction ratio k1.

In this embodiment, the first and second balance shafts 200, 500 have forms analogous to those of the first and second balance shafts depicted in FIG. 9. The shaft body 502 of the second balance shaft 500 is, however, closed at one of its ends, so that the first balance shaft 200 does not extend right through it.

The means 400 for adjusting the phase angle between the two balance shafts 200, 500 here again comprise an electric stepping motor 401 and a pinion 403 which is mounted fixedly on the output shaft 402 of this electric motor 401 and which meshes with a set of teeth provided on the outer peripheral edge of the planet carrier 352.

This embodiment of the invention is the preferred one because it is the one that has the simplest design. To drive the two balance shafts 200, 500 at the desired speed and in the desired direction it in fact makes perfect use of the direction of rotation of the camshaft 19 with respect to the crankshaft 10 and of the fact that the input and output of the epicyclic gear train 350 turn in opposite directions.

Figure 11:
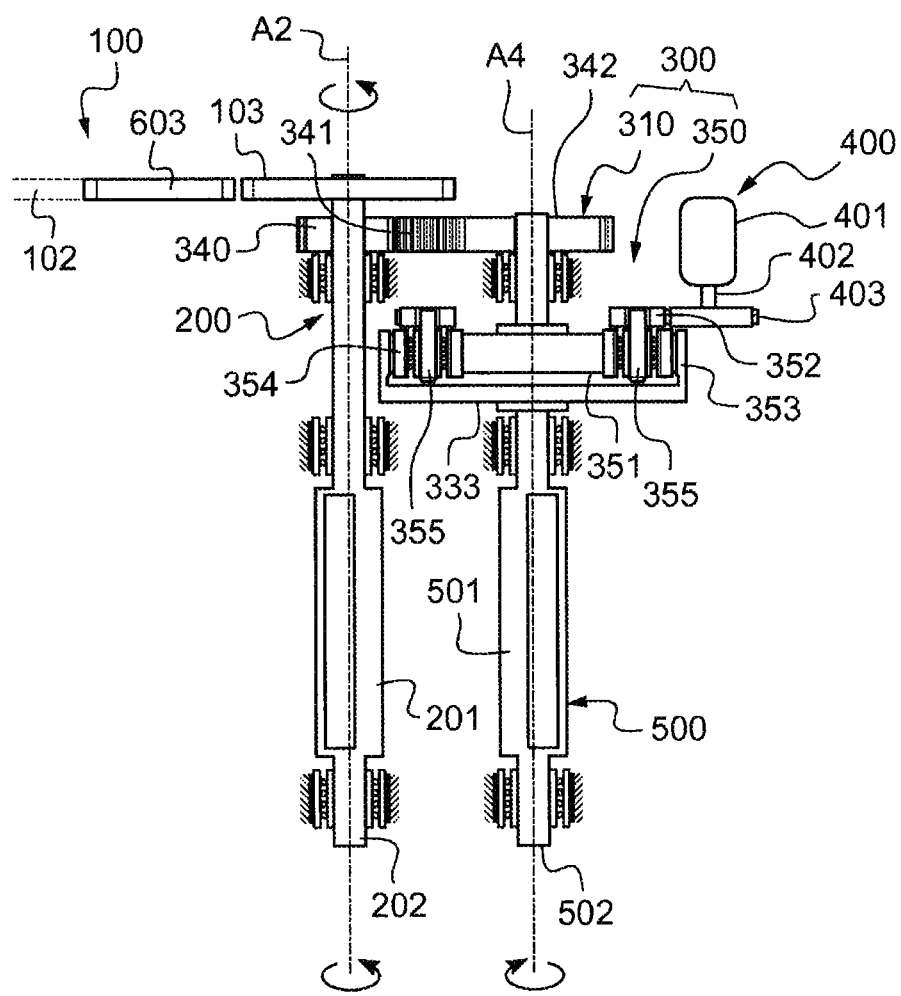

FIG. 11 depicts a sixth embodiment of the balancing device.

In this embodiment, the two balance shafts 200, 500 are mounted to rotate about parallel and distinct balance axes A2, A4. Moreover, they are preferably situated in such a way that the plane containing these two balance axes A2, A4 is orthogonal to the axes A10 of the cylinders 4.

In this embodiment, the two balance shafts 200, 500 have a part of widened diameter, inside which there is a hollow, so that the non-hollowed part forms a balance weight 201, 501.

The first balance shaft 200 at one end bears the input pinion 103 on which the timing belt 102 is engaged.

It also has, between its larger-diameter part and this input pinion 103, an intermediate pinion 340 on which an intermediate belt 341 is engaged.

This intermediate belt 341 is also engaged around a pinion 342 fixed to the sun gear 351 of the epicyclic gear train 350.

In this embodiment, the reducer 310 is therefore formed by these pinions 103, 342, the diameters and numbers of teeth of which are chosen according to the reduction ratio k1 desired.

The outer annulus 353 of this epicyclic gear train 350 for its part has a flange 333 which is fixed to one of the ends of the second balance shaft 500, to drive the rotation of this shaft.

Once again, the means 400 for adjusting the phase angle between the two balance shafts 200, 500 comprise an electric motor 401 and a pinion 403 which is fixedly mounted on the output shaft 402 of this electric motor 401 and which meshes with a peripheral set of teeth provided on the outer peripheral edge of the planet carrier 352.

The present invention is not in any way restricted to the embodiments described and depicted in the figures and a person skilled in the art will know how to vary it in any way that is consistent with its spirit.

In particular, in order to reduce the electrical power consumption of the electric motor 401 when no adjustment to the phase angle between the two balance shafts 200, 500 is needed, a mechanical device for immobilizing the output shaft 402 of the electric motor 401 may be provided.

In another alternative form, provision may be made for the invention to be incorporated into an internal combustion engine comprising four in-line cylinders. The drive means will then be arranged in such a way that the two balance shafts rotate at rotational speeds which are twice as high as the rotational speed of the crankshaft. The phase angle between the two balance shafts will be controlled then in the same way as mentioned herein above, the phase angle a being measured when the two central pistons of the engine are at top dead center.

In another alternative form of embodiment of the invention, provision may be made for the means for adjusting the phase angle to comprise not an electric motor but rather a hydraulic phase-adjuster (for example a cylinder actuator designed to alter the angular position of the planet carrier of the epicyclic gear train).

Provision may also be made for the second drive means to comprise not an epicyclic gear train and a reducer but rather a hydraulic phase-adjuster that rotates as one with an intermediate shaft the input and output pinions of which are respectively secured for the purposes of rotation to a pinion of the camshaft and a pinion of the first balance shaft.

In another alternative form, provision may be made for the second drive means to comprise a mechanical clutch comprising two disks designed to press against one another. In this alternative form, the means for adjusting the phase angle will then be formed of a simple cable designed to open the clutch in order to alter the phase angle between the first and second balance shafts.

The invention claimed is:

1. An internal combustion engine comprising:
   an even number of in-line cylinders;
   a crankshaft mounted to rotate about an engine axis;
   first and second balance shafts mounted to rotate about balance axes that are parallel and distinct from the engine axis;
   first rotational-drive means for turning the first balance shaft in a direction of rotation that is opposite the direction of rotation of the crankshaft and at a rotational speed that is a function of a rotational speed of the crankshaft;
   second rotational-drive means for turning the second balance shaft in a direction of rotation that is opposite the direction of rotation of the first balance shaft and at a rotational speed that is a function of the rotational speed of the crankshaft; and
   phase adjustment means for adjusting a phase angle between the first and second balance shafts.

2. The internal combustion engine as claimed in claim 1, in which the first and second rotational-drive means are configured to drive the first and second balance shafts at equal rotational speeds when the phase adjustment means is inactive.

3. The internal combustion engine as claimed in claim 1, in which:
   the second rotational-drive means comprises a reducer and an epicyclic gear train; and
   the phase adjustment means is configured to control a reduction ratio of the epicyclic gear train.

4. The internal combustion engine as claimed in claim 3, in which:
   the epicyclic gear train comprises an outer annulus, a sun gear, and a planet carrier carrying at least one planet pinion interposed between the outer annulus and the sun gear; and
   the phase adjustment means comprises an electric motor including an output shaft connected to the planet carrier to adjust the angular position of each planet pinion about an axis of the outer annulus.

5. The internal combustion engine as claimed in claim 4, in which:
   one of the first and second balance shafts is fixed or directly connected to the outer annulus or to the sun gear; and
   the other of the first and second balance shafts is indirectly connected to the outer annulus or to the sun gear, via the reducer.

6. The internal combustion engine as claimed in claim 4, in which:
   one of the first and second balance shafts is formed as one with the outer annulus or the sun gear; and
   the other of the first and second balance shafts is indirectly connected to the outer annulus or to the sun gear via the reducer.

7. The internal combustion engine as claimed in claim 1, in which the first and second balance shafts each comprise a balance weight configured to generate a centrifugal force of an intensity equal to that generated by the other balance weight when the first and second balance shafts are rotating at a same angular velocity.

8. The internal combustion engine as claimed in claim 7, in which, with each cylinder housing a piston, the balance weight of one of the balance shafts is at bottom dead center when the pistons of two central cylinders are at top dead center.

9. The internal combustion engine as claimed in claim 7, in which a median plane between planes of rotation of centers of gravity of the balance weights coincides with a plane of symmetry of two central cylinders.

10. The internal combustion engine as claimed in claim 1, in which the balancing axes of the first and second balance shafts are separate.

11. The internal combustion engine as claimed in claim 1, in which the balancing axes of the first and second balance shafts coincide.

12. The internal combustion engine as claimed in claim 1, in which one of the first and second balance shafts is hollow and has the other of the first and second balance shafts passing through it.

13. The internal combustion engine as claimed in claim 1, further comprising a cylinder block covered by a cylinder head, in which the first and second balance shafts are at least partially housed inside the cylinder head.

14. The internal combustion engine as claimed in claim 1, in which, with each cylinder housing a piston, the phase adjustment means comprises:
   acquisition means for acquiring the rotational speed of the crankshaft;
   acquisition means for acquiring a phase angle that is a difference in phase between angular positions of the first and second balance shafts when the pistons housed in two central cylinders are at top dead center; and
   control means for controlling the phase adjustment means as a function of the acquired rotational speed and of the acquired phase angle.

15. The internal combustion engine as claimed in claim 1, in which when the phase adjustment means is inactive, the first and second rotational-drive means are configured to drive the first and second balance shafts at rotational speeds equal to that of the crankshaft if the engine has two cylinders and equal to twice that of the crankshaft if the engine has four cylinders.

16. A method for controlling an internal combustion engine as claimed in claim 1, comprising:
   acquiring the rotational speed of the crankshaft;
   acquiring a phase angle that is a difference in phase between the angular positions of the first and second balance shafts when the pistons housed in two central cylinders are at top dead center; and
   when the acquired rotational speed exceeds a first determined threshold, controlling the phase adjustment means to set the phase angle to a predetermined angle less than 90°; and
   when the acquired rotational speed drops below a second determined threshold, controlling the phase adjustment means to set the phase angle to 180°.

17. The control method as claimed in claim 16 for controlling an internal combustion engine, in which the predetermined angle is equal to twice an angle of inclination between a plane passing through axes of two central cylinders and a plane passing through an engine axis and through a median axis between the two balancing axes.

* * * * *